United States Patent
Singh et al.

(10) Patent No.: US 10,169,156 B2
(45) Date of Patent: Jan. 1, 2019

(54) AUTOMATIC RESTARTING OF CONTAINERS

(71) Applicant: International Business Machines Corporation, Armonk, NY (US)

(72) Inventors: Sunil Kumar S. Singh, Bangalore (IN); Rajat R. Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 15/216,153

(22) Filed: Jul. 21, 2016

(65) Prior Publication Data

US 2018/0024889 A1 Jan. 25, 2018

(51) Int. Cl.
*G06F 11/14* (2006.01)
*G06F 9/445* (2018.01)
*G06F 9/455* (2018.01)

(52) U.S. Cl.
CPC .......... *G06F 11/1438* (2013.01); *G06F 9/445* (2013.01); *G06F 9/45558* (2013.01); *G06F 2009/45575* (2013.01); *G06F 2201/805* (2013.01); *G06F 2201/85* (2013.01)

(58) Field of Classification Search
CPC ............. G06F 11/2097; G06F 11/0709; G06F 11/0748; G06F 11/3055; G06F 11/3082; G06F 11/008; G06F 11/076; G06F 11/1425; G06F 11/2025; G06F 11/2294
See application file for complete search history.

(56) References Cited

U.S. PATENT DOCUMENTS

| | | | | |
|---|---|---|---|---|
| 7,328,367 B2 * | 2/2008 | Ukai | ................... | G06F 11/0712 714/13 |
| 7,360,122 B2 * | 4/2008 | Srivastava | .......... | G06F 11/0709 714/47.3 |
| 7,415,719 B2 * | 8/2008 | Moghe | ................. | H05K 7/1495 726/1 |
| 7,634,684 B2 * | 12/2009 | Clark | .................. | G06F 11/1438 714/4.1 |
| 7,634,687 B2 | 12/2009 | Haselden et al. | | |
| 9,256,467 B1 | 2/2016 | Singh et al. | | |
| 2003/0208590 A1 * | 11/2003 | Childress | ............ | H04L 41/0681 709/224 |
| 2003/0221002 A1 * | 11/2003 | Srivastava | .......... | G06F 11/0709 709/224 |
| 2004/0003319 A1 * | 1/2004 | Ukai | ................... | G06F 11/0712 714/25 |

(Continued)

*Primary Examiner* — Nadeem Iqbal
(74) *Attorney, Agent, or Firm* — Robert Bunker; Edell, Shapiro & Finnan, LLC

(57) ABSTRACT

A method, a processing device, and a computer program product are provided. In various embodiments, a computing device reads predefined policy information defining one or more conditions for restarting a container. The computing device monitors the container to detect an occurrence of any one of the one or more conditions defined by the predefined policy information. The computing device automatically restarts the container after detecting the occurrence of any one of the one or more conditions defined by the predefined policy information. In some embodiments, the computing device waits a certain amount of time, as specified in the predefined policy information, before automatically restarting the container.

20 Claims, 4 Drawing Sheets

(56) References Cited

U.S. PATENT DOCUMENTS

2006/0149993 A1\* 7/2006 Srivastava ............ G06F 11/326
 714/4.11
2007/0088972 A1\* 4/2007 Srivastava ............ G06F 11/326
 714/4.11

\* cited by examiner

210

```
<ContainerRestart>
    <Compute>  302                                          326
    <LogFile>'/var/log/compute/compute_xxxxx_yyyyy.log</.LogFile>
      ⎧ <Condition1 timeout='5s'>
308 ⎨ <Message = '500 Server Error: Internal Server Error cannot allocate memory'/>
      ⎩ </Condition1>
      ⎧ <Condition2 timeout='3s'>
310 ⎨ <Message = '502 Server Error: Internal Server Error: Timeout waiting for Compute'/>
      ⎩ </Condition2>
      ⎧ <Condition3 timeout='7s'>
312 ⎨ <Message = '507 Server Error: Virtual Disk Error : The parent virtual disk has been
      ⎪   modified since the child was created.'/>
      ⎩ </Condition3>
    </Compute>
    <Memory>  304                                           328
    <LogFile>'/var/log/memory/memory_xxxxx_yyyyy.log</LogFile>
      ⎧ <Condition1 timeout='5s'>
314 ⎨ <Message = '702 Memory Error: Memory Error: Address not readable'/>
      ⎩ </Condition1>
      ⎧ <Condition2 timeout='3s'>
316 ⎨ <Message = '705 Memory Error: Virtual Memory Error : Your system has no paging file,
      ⎪   or the paging file is too small.'/>
      ⎩ </Condition2>
      ⎧ <Condition3 timeout='7s'>
318 ⎨ <Message = '708 Memory Error: Physical Memory Error : Not enough Physical
      ⎪   Memory'/>
      ⎩ </Condition3>
    </Memory>
    <Network>  306                                          330
    <Log File>'/var/log/network/network_xxxxx_yyyyy.log</LogFile>
      ⎧ <Condition1 timeout='5s'>
320 ⎨ <Message = '404 Client Error: Not Found no such network interface'/>
      ⎩ </Condition1>
      ⎧ <Condition2> timeout='3s'>
322 ⎨ <Message = 'Network error: Connection Refused'/>
      ⎩ </Condition2>
      ⎧ <Condition3 timeout='7s'>
324 ⎨ <Message = 'Unable to resolve target system name (IP address/hostname)' />
      ⎩ </Condition3>
    </Network>
</ContainerRestart>
```

FIG.3

AUTOMATIC RESTARTING OF CONTAINERS

BACKGROUND

Present invention embodiments pertain to containers residing on a computing device and, more specifically, to automatic restarting of a container according to a container restart policy that specifies one or more conditions of a container, which, when detected, causes the automatic restarting of the container.

A container is a computing unit that includes at least one application and all dependencies, but shares a kernel with other containers running as isolated processes in user space on a host operating system. Containers do not imply any specific infrastructure: containers of various kinds run on various computers and in various infrastructure, including cloud infrastructure.

SUMMARY

According to embodiments of the present invention, a computer-implemented method, a processing device, and a computer program product are provided.

In an aspect of the invention, a method is provided for automatically restarting a container. In the method, a computing device reads predefined policy information, which defines one or more conditions for restarting a container. The computing device monitors the container in order to detect an occurrence of any of the one or more conditions defined by the predefined policy information. The computing device automatically restarts the container after the occurrence of the one or more conditions defined by the predefined policy information is detected.

In a second aspect of the invention, a computing device is provided. The computing device includes at least one processor and a memory connected with the at least one processor. The memory includes instructions, which when executed by the at least one processor causes the at least one processor to be configured to: read predefined policy information included in a file and having one or more conditions for restarting a container; monitor the container to detect an occurrence of any one of the one or more conditions defined by the predefined policy information; and automatically restart the container after the occurrence of any one of the one or more conditions is detected.

In a third aspect of the invention, a computer program product is provided. The computer program product includes a computer readable storage medium having computer readable program code embodied therewith to be executed on a computing system to: read predefined policy information included in a file, wherein the predefined policy information defines one or more conditions for restarting a container; monitor the container to detect an occurrence of any of the one or more conditions defined by the predefined policy information; and after detecting the occurrence of any of the one or more conditions, restart the container.

BRIEF DESCRIPTION OF THE DRAWINGS

Generally, like reference numerals in the various figures are utilized to designate like components.

FIG. 3 illustrates a sample container restart policy.

DETAILED DESCRIPTION

Figure 1:
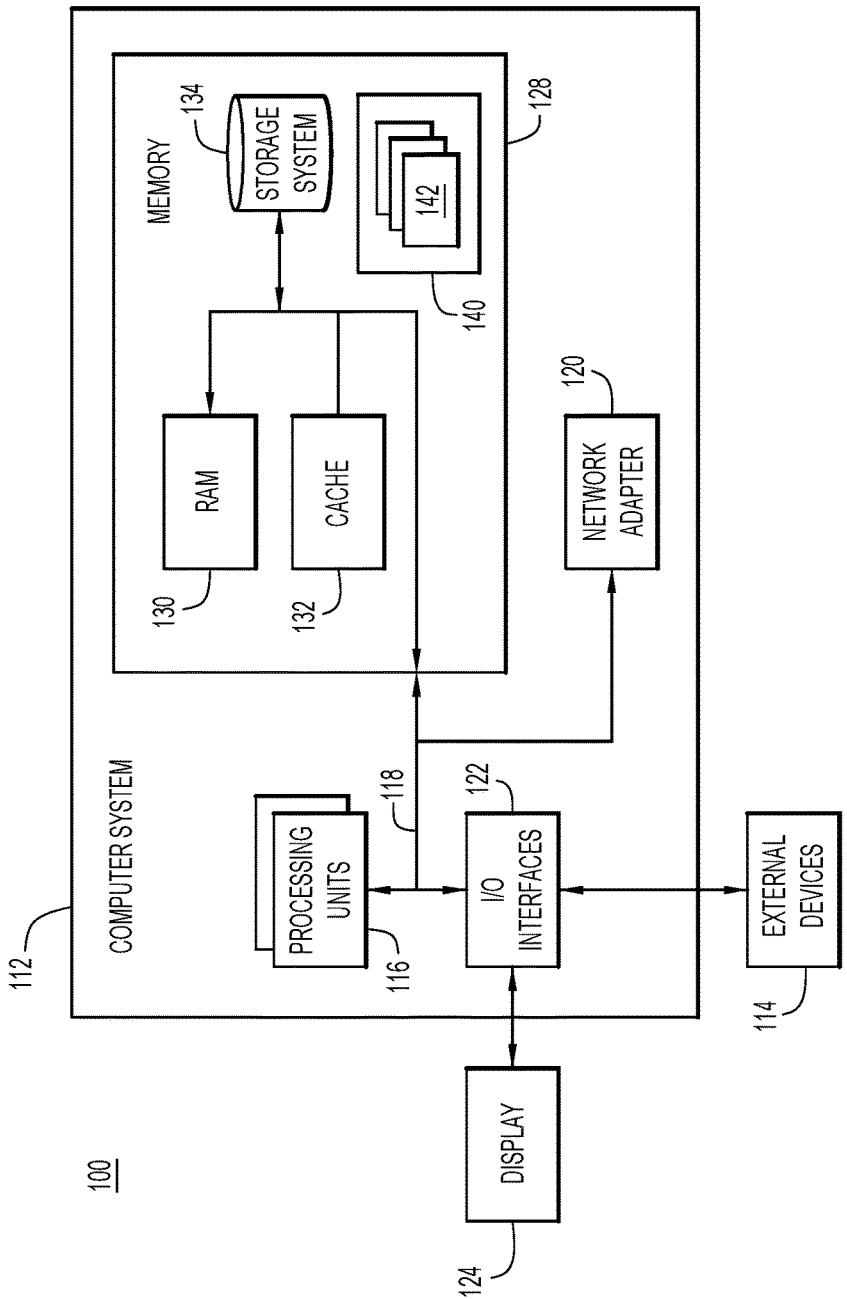
FIG. 1 illustrates an example computing device for implementing various embodiments.

With reference to FIG. 1, a schematic of an example computing device 100 is shown, which may implement various embodiments. Computing device 100 is only one example of a suitable computing device and is not intended to suggest any limitation as to the scope of use or functionality of embodiments of the invention described herein. Regardless, computing device 100 is capable of being implemented and/or performing any of the functionality set forth herein.

In computing device 100, there is a computer system 112 which is operational with numerous other general purpose or special purpose computing system environments or configurations. Examples of well-known computing systems, environments, and/or configurations that may be suitable for use with computer system 112 include personal computer systems, server computer systems, hand-held or laptop devices, multiprocessor systems, microprocessor-based systems, minicomputer systems, mainframe computer systems, and distributed cloud computing environments that include any of the above systems or devices, and the like.

Computer system 112 may be described in the general context of computer system executable instructions, such as program modules, being executed by a computer system. Generally, program modules may include routines, programs, objects, components, logic, data structures, and so on that perform particular tasks or implement particular abstract data types. Computer system 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 112 is shown in the form of a general-purpose computing device. Components of computer system 112 may include one or more processors or processing units 116, a system memory 128, and a bus 118 that couples various system components including system memory 128 to one or more processors 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 112 typically includes a variety of computer system readable media. Such media may be any available media that is accessible by computer system 112, and includes both volatile and non-volatile media, and removable and non-removable media.

System memory 128 can include computer system readable media in the form of volatile memory, such as random access memory (RAM) 130 and/or cache memory 132. Computer system 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, the one or more application programs, the other program modules, and program data or some combination thereof, may include an implementation of a networking environment. Program modules 142 generally carry out the functions and/or methodologies of embodiments of the invention as described herein.

Computer system 112 may also communicate with one or more external devices 114 such as a keyboard, a pointing device, a display 124, etc.; one or more devices that enable a user to interact with computer system 112; and/or any devices (e.g., network card, modem, etc.) that enable computer system 112 to communicate with one or more other computing devices. Such communication can occur via Input/Output (I/O) interfaces 122. Still yet, computer system 112 can communicate with one or more networks such as a local area network (LAN), a general wide area network (WAN), and/or a public network (e.g., the Internet) via network adapter 120. As depicted, network adapter 120 communicates with the other components of computer system 112 via bus 118. It should be understood that, although not shown, other hardware and/or software components could be used in conjunction with computer system 112. Examples, include: microcode, device drivers, redundant processing units, external disk drive arrays, RAID systems, tape drives, and data archival storage systems, etc.

Currently, in order to release resources and avoid deadlocks and application deaths due to a lack of resources, a container is manually restarted. In some cases, a container may be manually restarted after the container generates an error, such as:
  a. Cannot start container <id>: adding interface <interface_name> to bridge container0 failed: could not find bridge container0: no such interface;
  b. Cannot start container: fork/exec/var/lib/container/init/containerinit-1.5.0: cannot allocate memory;
  c. Cannot start container: iptables failed: iptables -wait -t nat -A container -p tcp -d 0/0 -dport <port>! -i container0 -j DNAT—to-destination <ip>:<port>: (fork/exec/sbin/iptables: cannot allocate memory);
  d. Cannot start container <id>: Error starting userland proxy: listen tcp 0.0.0.0:<port>: bind: address already in use;
  e. Error pulling image (<tag>) from <image>, Untar fork/exec /usr/lib/container: cannot allocate memory
  f. Timeout when pulling image from the registry Fixed, non-customizable policies may determine when an automatic container restart occurs after exiting the container. For example, one of the following predefined, fixed policies may be specified:
  a. no Container is not restarted upon exiting. This is a default policy.
  b. on-failure Restart only if the container exits with a non-zero status. Optionally, the number of restart retries may be limited.
  c. always Always restart the container regardless of the exit status.
  d. unless-stopped Always restart the container regardless of the exit status unless the container was placed in a stopped state.

A fixed restart policy such as one of the above provides customers very little flexibility. In addition, state information of a container is currently not saved before a restart occurs. Consequently, a restarted container is unable to resume from where the container left off.

Figure 2:
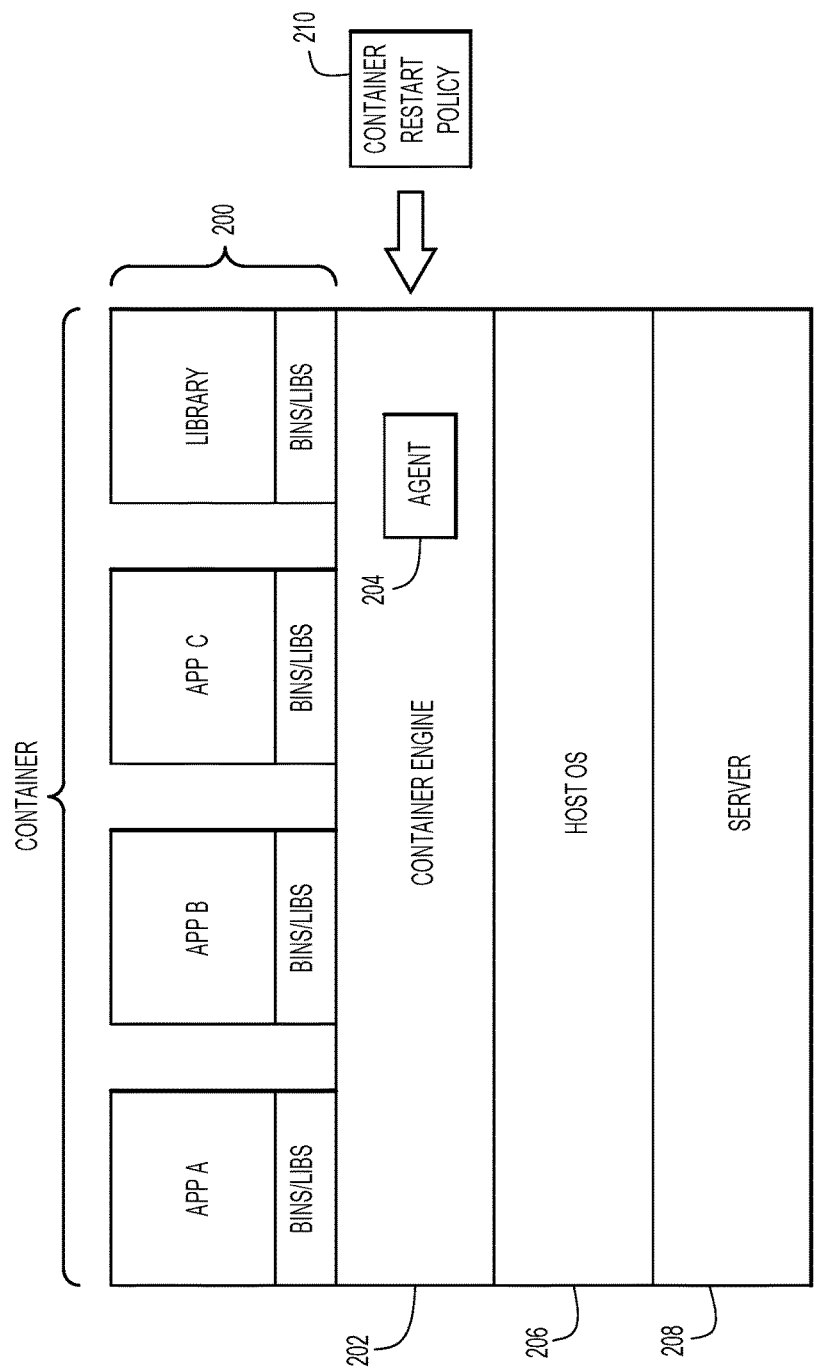
FIG. 2 shows an example logical architecture of an embodiment.

With reference to FIG. 2, an example container is shown having three applications, applications A, B and C, with respective libraries and a separate library. A container engine 202 is responsible for monitoring a state of container 200. An agent 204 may be included within container engine 202. Agent 204 may monitor a condition of container 200, such as occurrence of an event, for example.

Container engine 202 is executed by a host operating system 206, which may include a commercial operating system. Host operating system 206 may execute on a computing device, such as server 208 (e.g., which may be implemented by computer system 112).

Container 200 may be started via a command provided via a command line interface (CLI). The command may include a reference to a container restart policy 210, which may reside in a file stored in a known location. Container engine 202 or agent 204 may store container restart policy 210 in a database. Container restart policy 210 may include a number of error messages with respective timeout intervals and a location of one or more log files to be monitored for the error messages.

In some embodiments, agent 204 may monitor one or more log files (not shown) produced by container 200. When various anomalies occur, container 200 may post an error message to one of the one or more log files, which may include one or more of the error messages mentioned previously. When agent 204 detects at least a portion of an error message in the log file that has a pattern that matches a pattern of an error message of container restart policy 210, after a time interval corresponding to a time interval associated with the pattern matched error message in container restart policy 210, agent 204 may save a state of container 200 and may automatically cause container 200 to restart. Upon restarting, the state of container 200 may be restored, such that container 200 and any applications stored therein may continue from where they left off.

FIG. 3 shows an example container restart policy 210 written in eXtensible Markup Language (XML). In other embodiments, a container restart policy may be written in a different language. Container restart policy 210 has defined therein a number of categories including Compute 302, Memory 304 and Network 306. Each of the categories has entries defining conditions, i.e., conditions 308, 310 and 312 for Compute category 302, etc. Each entry includes a time interval and a character string, which includes at least a portion of an error message that may be generated with respect to a container.

Within Compute 302 category are defined first condition 308 including a timeout interval of five seconds and at least a portion of a character string corresponding to an error message "500 Server Error: Internal Server Error cannot allocate memory", second condition 310 including a timeout interval of three seconds and at least a portion of a character string corresponding to an error message "502 Server Error: Internal Server Error: Timeout waiting for Compute", and third condition 312 including a timeout interval of seven seconds and at least a portion of a character string corresponding to an error message "507 Server Error: Virtual Disk Error: The parent virtual disk has been modified since the child was created."

Within Memory 304 category are defined first condition 314 including a timeout interval of five seconds and at least a portion of a character string corresponding to an error message "702 Memory Error: Memory Error: Address not readable", second condition 316 including a timeout interval of three seconds and at least a portion of a character string corresponding to an error message "705 Memory Error: Virtual Memory Error: Your system has no paging file, or the paging file is too small", and third condition 318 including a timeout interval of seven seconds and at least a portion of a character string corresponding to an error message "708 Memory Error: Physical Memory Error: Not enough Physical Memory."

Within Network 306 category are defined first condition 320 including a timeout interval of five seconds and at least a portion of a character string corresponding to an error message "404 Client Error: Not Found no such network interface", second condition 322 including a timeout interval of three seconds and at least a portion of a character string corresponding to an error message "Network Error: Connection Refused", and third condition 324 including a timeout interval of seven seconds and at least a portion of a character string corresponding to an error message "Unable to resolve target system name (IP address/hostname."

A restart policy may include reference to a location of one or more log files. For example, restart policy 210 includes a reference to a location of a log file 326, 328, 330 for each category 302, 304, 306, respectively.

Figure 4:
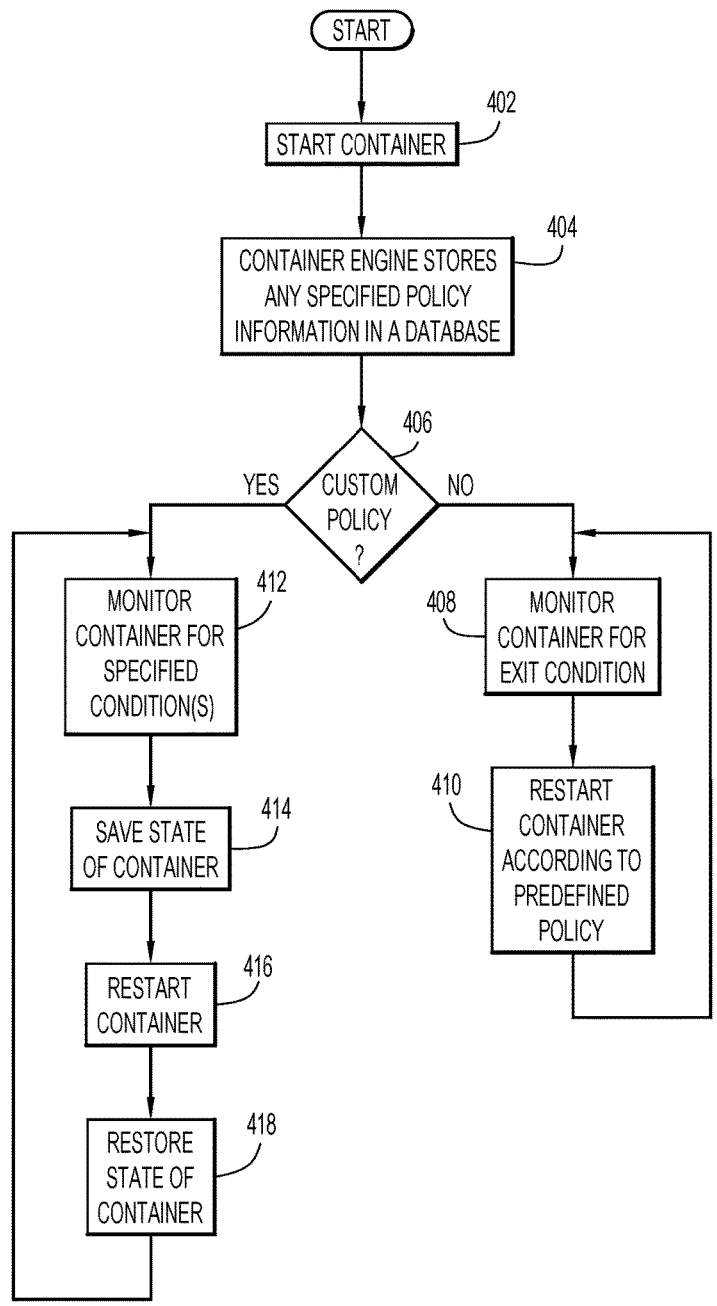
FIG. 4 is a flowchart which explains example processing in various embodiments.

FIG. 4 is a flowchart that illustrates example processing in an embodiment. The process may begin with container engine 202 starting a container, at 402. At 404, agent 204 may store any specified policy information from a container restart policy in a database. At 406, container engine 202 may determine whether a custom policy is associated with the container. If no custom policy is associated with the container, the container may use a predefined restart policy. As stated earlier, the predefined restart policy may be: "no", indicating that the container is not to be restarted when it exits; "on-failure[:max-retries]", indicating that the container is restarted only if the container exited with a non-zero exit status, wherein a number of restart retries may be limited to a specified number of retries; "always", indicating that the container is to be restarted regardless of the exit status; and "unless-stopped", indicating that the container is always to be restarted regardless of the exit status unless the container has been put into a stopped state.

Container engine 202 may then monitor a container for an exit condition, at 408. When an exit condition occurs, container engine 202 may restart the container according to the predefined policy, at 410.

If, at 406, container engine 202 determines that a custom restart policy has been specified (e.g., restart policy 210), then agent 204 may monitor the container for conditions or patterns of error messages matching patterns of error messages specified in the container restart policy, at 412. Agent 204 may achieve this by monitoring patterns of error messages generated on behalf of the container to one or more log files, as specified in the restart policy 210. When a pattern of an error message in the log file matches a pattern of an error message specified in the container restart policy, agent 204 may save a state of the container, including a state of any applications within the container, at 414. Agent 204 may then cause the container to automatically restart after waiting a time interval associated with the pattern matched error message in the container restart policy, at 416. After the container restarts, agent 204 may restore the state of the container and the state of any applications within the container.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowchart may be modified in any manner that accomplishes the functions described herein. In addition, the functions in the flowchart or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The invention claimed is:

1. A method for automatically restarting a container, comprising:
    reading, by a computing device, custom predefined policy information including one or more condition categories, each of which having a respective reference to a respective log file and defining at least one respective condition for restarting the container;
    monitoring, by an agent included in a container engine executed by the computing device, one or more respective log files, each of which corresponding to the respective reference to the respective log file of a corresponding condition category of the one or more condition categories, to detect an occurrence of any one of the at least one condition defined by any one of the one or more condition categories of the custom predefined policy information;
    detecting, by the agent, the occurrence of the any one of the at least one condition based on a presence of a string of characters, corresponding to the any one of the at least one condition, in a log file of a corresponding condition category of the any one of the at least one condition to which the custom predefined policy information refers, the string of characters being generated to the log file of the corresponding condition category on behalf of the container;
    in response to the detecting of the occurrence of the any one of the at least one condition, saving, by the agent, a state of the container including a state of one or more applications within the container;
    automatically restarting the container, by the agent, after detecting the occurrence and saving the state of the container; and
    after the automatic restarting of the container, restoring, by the agent, the state of the container, including the state of the one or more applications, wherein the one or more applications continue executing from where the one or more applications left off, thereby improving performance of the computing device.

2. The method of claim 1, wherein the custom predefined policy information includes, for each of the at least one respective condition of each of the one or more condition categories, a corresponding time interval which the agent is to wait after detecting the occurrence of the respective condition before performing the automatic restarting of the container.

3. The method of claim 1, wherein:
    the custom predefined policy information defines each of the at least one condition for restarting the container and includes at least a portion of a respective message; and
    the monitoring the one or more respective log files further comprises:
        monitoring the one or more respective log files for an occurrence of a string of characters having a pattern that matches a pattern of at least the portion of the respective message.

4. The method of claim 3, wherein the message includes an error message.

5. A computing device comprising:
    at least one processor; and
    a memory connected with the at least one processor, wherein the memory includes a plurality of instructions for the at least one processor to be configured to:
        execute a container engine including an agent executing therein;
        read custom predefined policy information included in a file, the custom predefined policy information including one or more condition categories, each of which having a respective reference to a respective log file and defining at least one respective condition for restarting a container,
        monitor, by the agent, one or more respective log files, each of which corresponding to the respective reference to the respective log file of a corresponding condition category of the one or more condition categories, to detect an occurrence of any one of the at least one condition defined by any one of the one or more condition categories of the custom predefined policy information,
        detect, by the agent, the occurrence of the any one of the at least one condition based on a presence of a string of characters, corresponding to the any one of the at least one condition, in a log file of a corresponding condition category of the any one of the at least one condition to which the custom predefined policy information refers, the string of characters being generated to the log file of the corresponding condition category on behalf of the container, in response to the detecting of the occurrence of the any one of the at least one condition, save, by the agent, a state of the container including a state of one or more applications within the container;
automatically restart the container, by the agent, after detecting the occurrence and saving the state of the container, and
after the automatic restarting of the container, restore, by the agent, the state of the container, including the state of the one or more applications, wherein the one or more applications continue executing from where the one or more applications left off, thereby improving performance of the computing device.

6. The computing device of claim 5, wherein the custom predefined policy information includes, for each of the at least one respective condition of each of the one or more condition categories, a corresponding time interval which the agent is to wait after detecting the occurrence of the respective condition before performing the automatic restarting of the container.

7. The computing device of claim 5, wherein:
the custom predefined policy information defines each of the at least one condition for restarting the container and includes at least a portion of a respective message; and
the at least one processor is further configured to have the agent monitor the one or more respective log files for an occurrence of a string of characters having a pattern that matches a pattern of at least the portion of the respective message.

8. The computing device of claim 7, wherein the respective message includes an error message.

9. A computer program product comprising:
a computer readable storage medium having computer readable program code embodied therewith for execution on a computing system, the computer readable program code being configured to be executed by the computing system to:
read custom predefined policy information included in a file, the custom predefined policy information including one or more condition categories, each of which having a respective reference to a respective log file and defining at least one respective condition for restarting a container;
monitor one or more respective log files, each of which corresponding to the respective reference to the respective log file of a corresponding condition category of the one or more condition categories, to detect an occurrence of any one of the at least one condition defined by any one of the one or more condition categories of the custom predefined policy information;
detect the occurrence of the any one of the at least one condition based on a presence of a string of characters, corresponding to the any one of the at least one condition, in a log file of a corresponding condition category of the any one of the at least one condition to which the custom predefined policy information refers, the string of characters being generated to the log file of the corresponding condition category on behalf of the container;
in response to the detecting of the occurrence of the any one of the at least one condition, save a state of the container including a state of one or more applications within the container;
automatically restart the container after detecting the occurrence and saving the state of the container; and
after the automatic restart of the container, restore the state of the container, including the state of the one or more applications, wherein the one or more applications continue executing from where the one or more applications left off, thereby improving performance of the computing system.

10. The computer program product of claim 9, wherein the custom predefined policy information includes, for each of the at least one respective condition of each of the one or more condition categories, a corresponding time interval to wait after detecting the occurrence of the respective condition before performing the automatic restarting of the container.

11. The computer program product of claim 9, wherein:
the custom predefined policy information defines each of the at least one condition for restarting the container and includes at least a portion of a respective message; and
the computer readable program code is further configured to be executed by the computing system to monitor the one or more respective log files for an occurrence of a string of characters having a pattern that matches a pattern of at least the portion of the respective message.

12. The computer program product of claim 11, wherein the respective message includes an error message.

13. The method of claim 1, wherein the respective reference to the respective log file for each of the one or more condition categories comprises a location of the respective log file.

14. The method of claim 1, wherein the custom predefined policy information is written in eXtensible Markup Language.

15. The method of claim 4, further comprising:
posting, by the container, the error message to one of the monitored one or more respective log files when an anomaly occurs.

16. The computing device of claim 5, wherein the respective reference to the respective log file for each of the one or more condition categories comprises a location of the respective log file.

17. The computing device of claim 5, wherein the custom predefined policy information is written in eXtensible Markup Language.

18. The computing device of claim 8, wherein the at least one processor is further configured to post the error message to one of the monitored one or more respective log files when an anomaly occurs.

19. The computer program product of claim 9, wherein the respective reference to the respective log file for each of the one or more condition categories comprises a location of the respective log file.

20. The computer program product of claim 12, wherein the computer readable program code is configured to be executed by the computing system to post the error message to one of the monitored one or more respective log files when an anomaly occurs.

* * * * *